March 18, 1941. M. A. GOLDMAN ET AL 2,235,760
LOOM
Filed Sept. 26, 1938  12 Sheets-Sheet 1

Inventors
Maurice A. Goldman
John O. Hunt
By Jack A. Richmond
Attorney

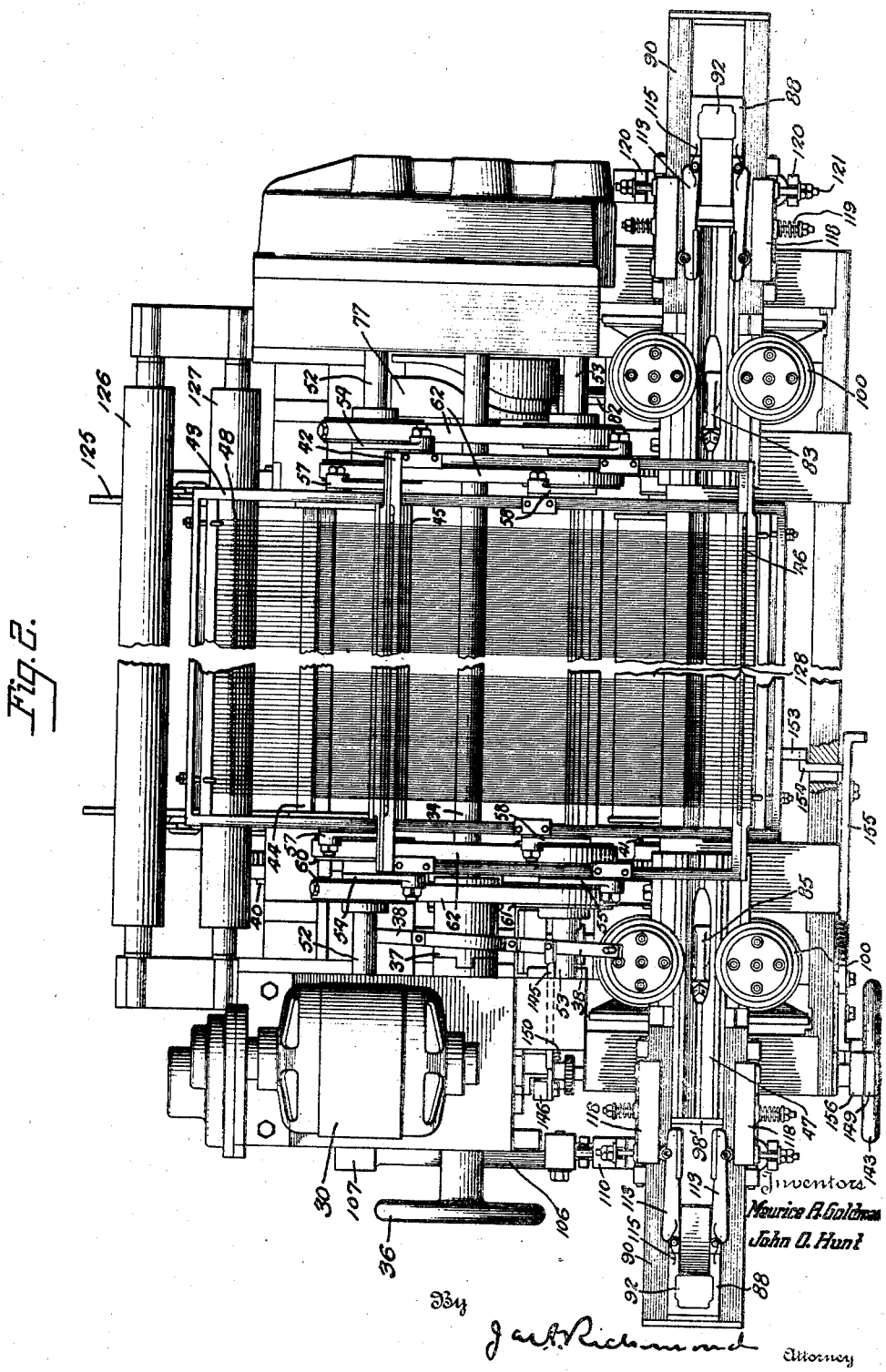

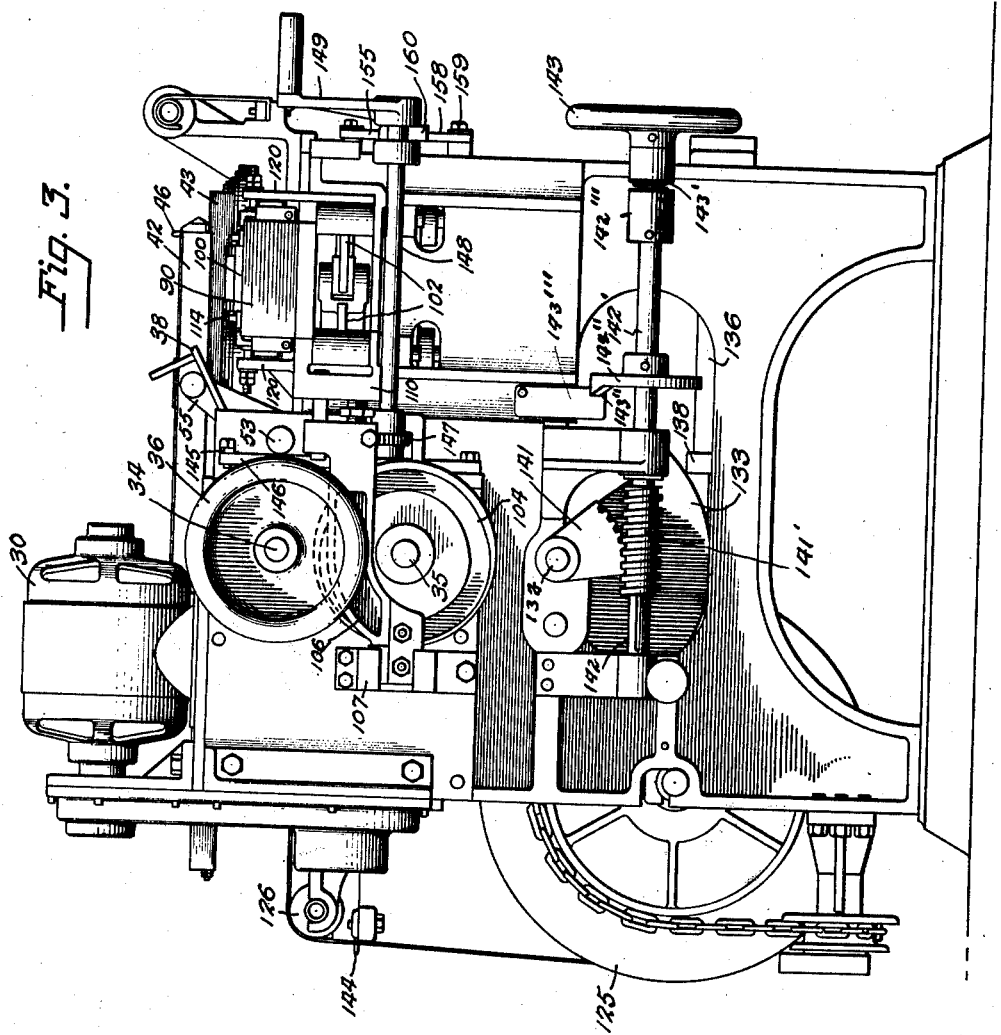

March 18, 1941. M. A. GOLDMAN ET AL 2,235,760
LOOM
Filed Sept. 26, 1938 12 Sheets-Sheet 4
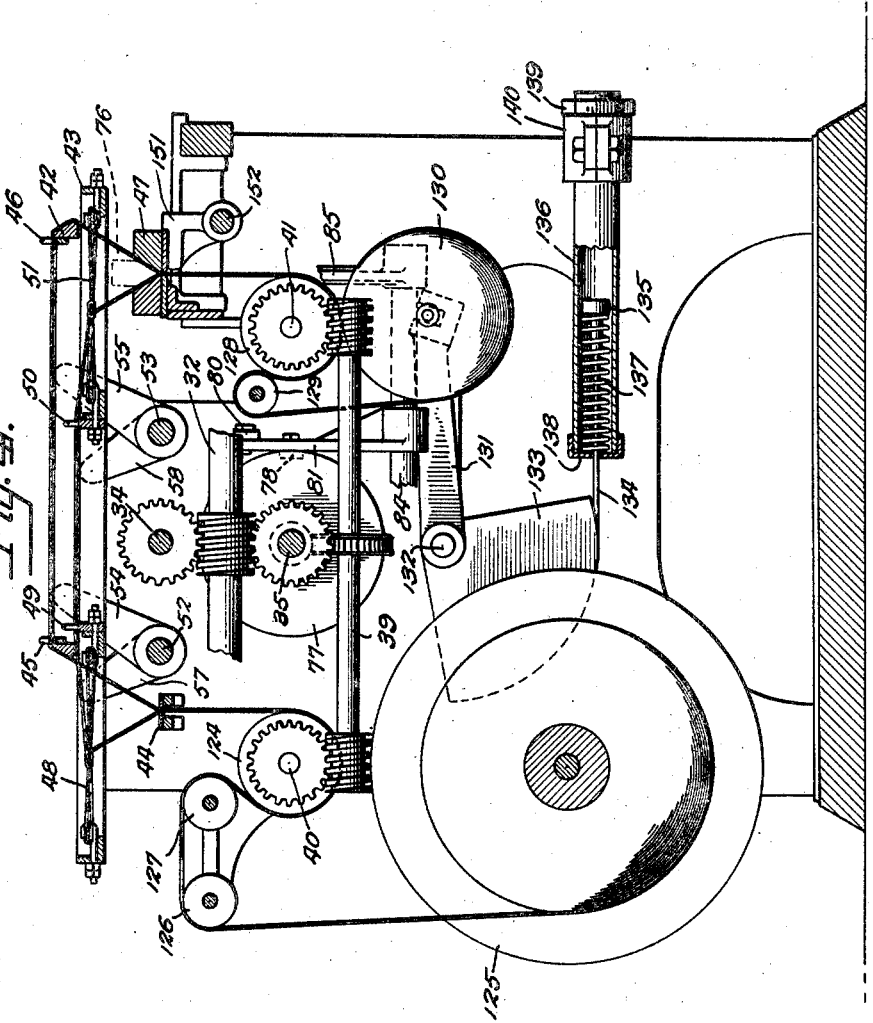
Inventors
Maurice A. Goldman
John O. Hunt
By Jae A. Richmond
Attorney

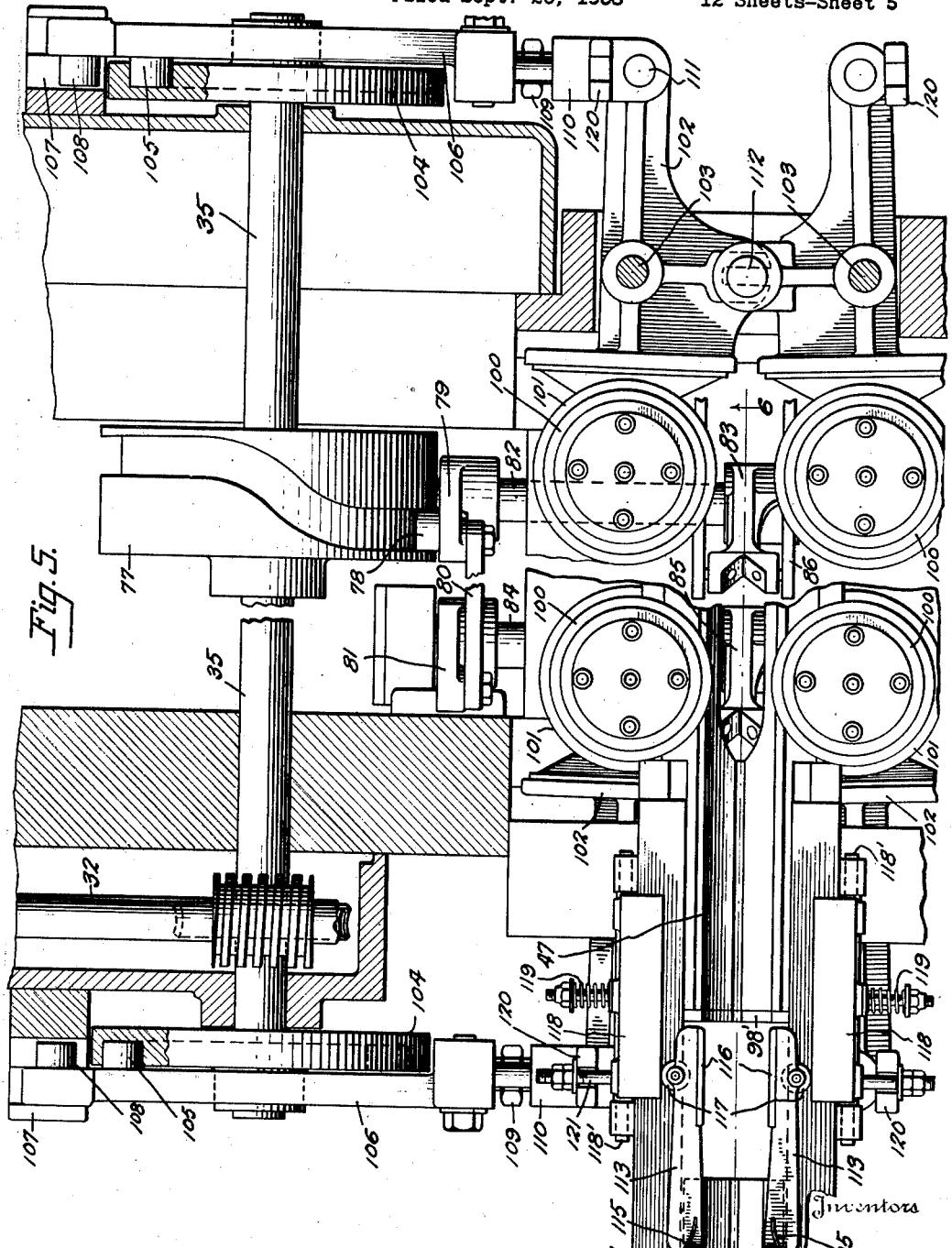

March 18, 1941.  M. A. GOLDMAN ET AL  2,235,760
LOOM
Filed Sept. 26, 1938  12 Sheets-Sheet 6
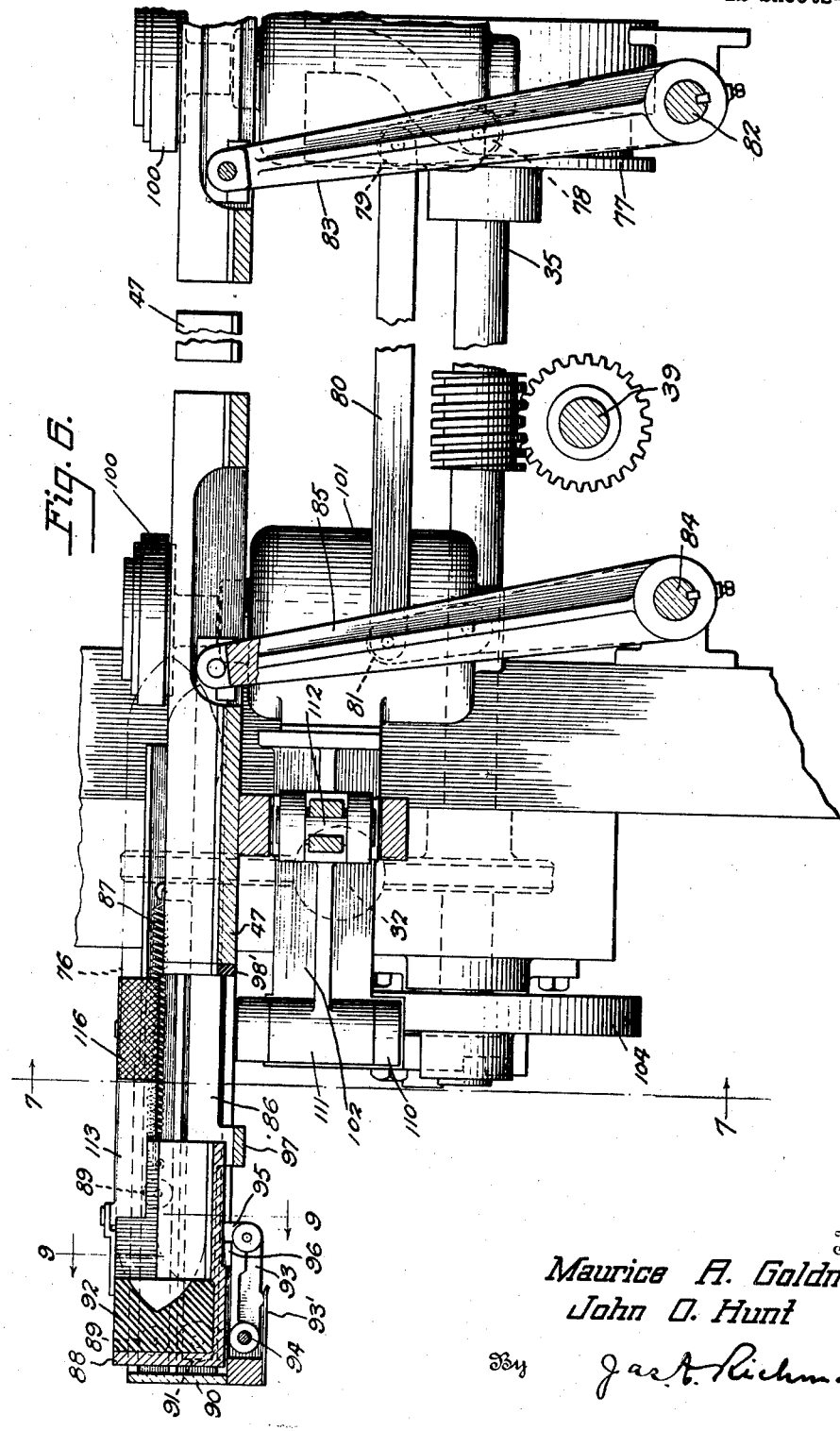
Inventors
Maurice A. Goldman
John O. Hunt
By Jas. B. Richmond
Attorney

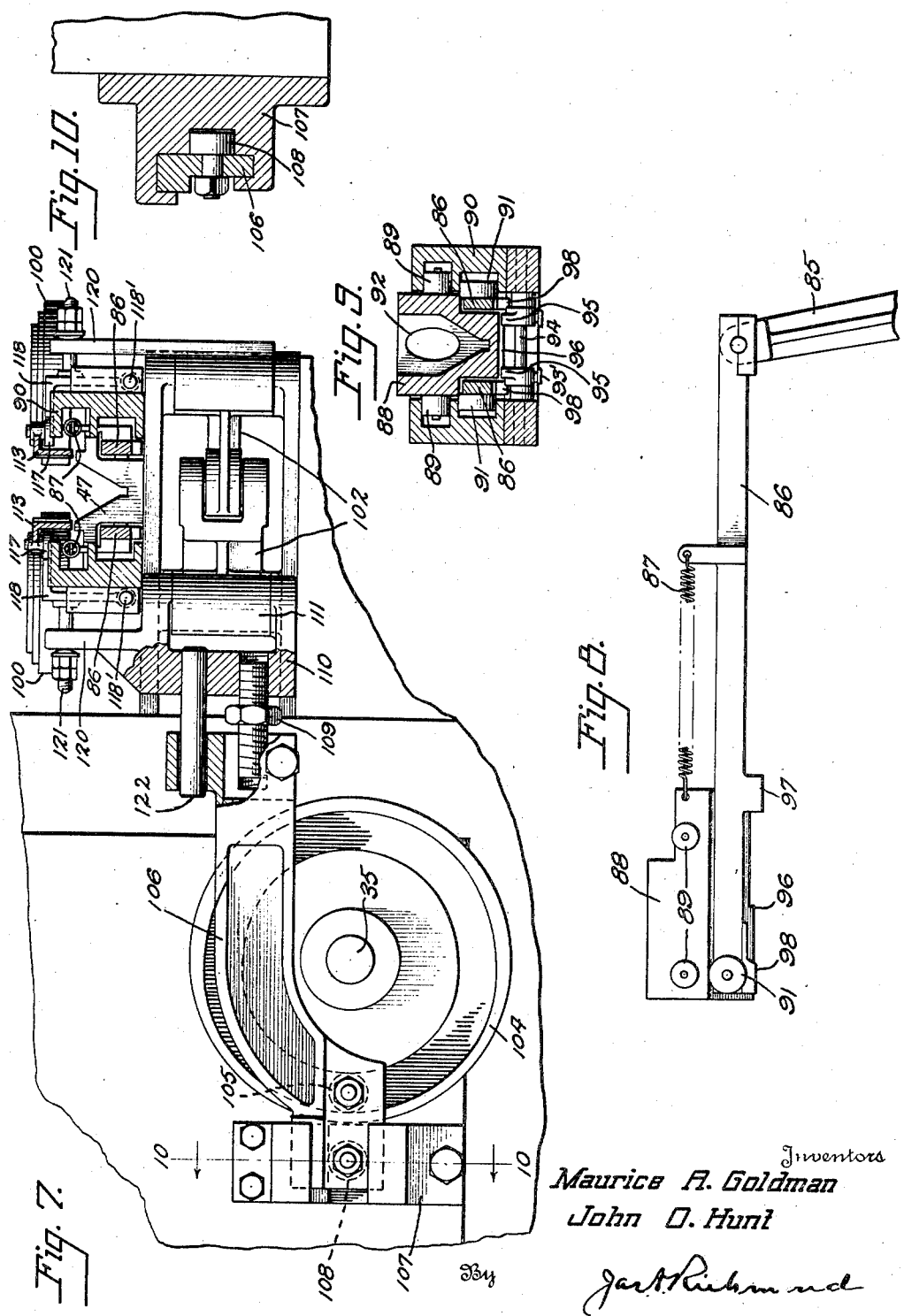

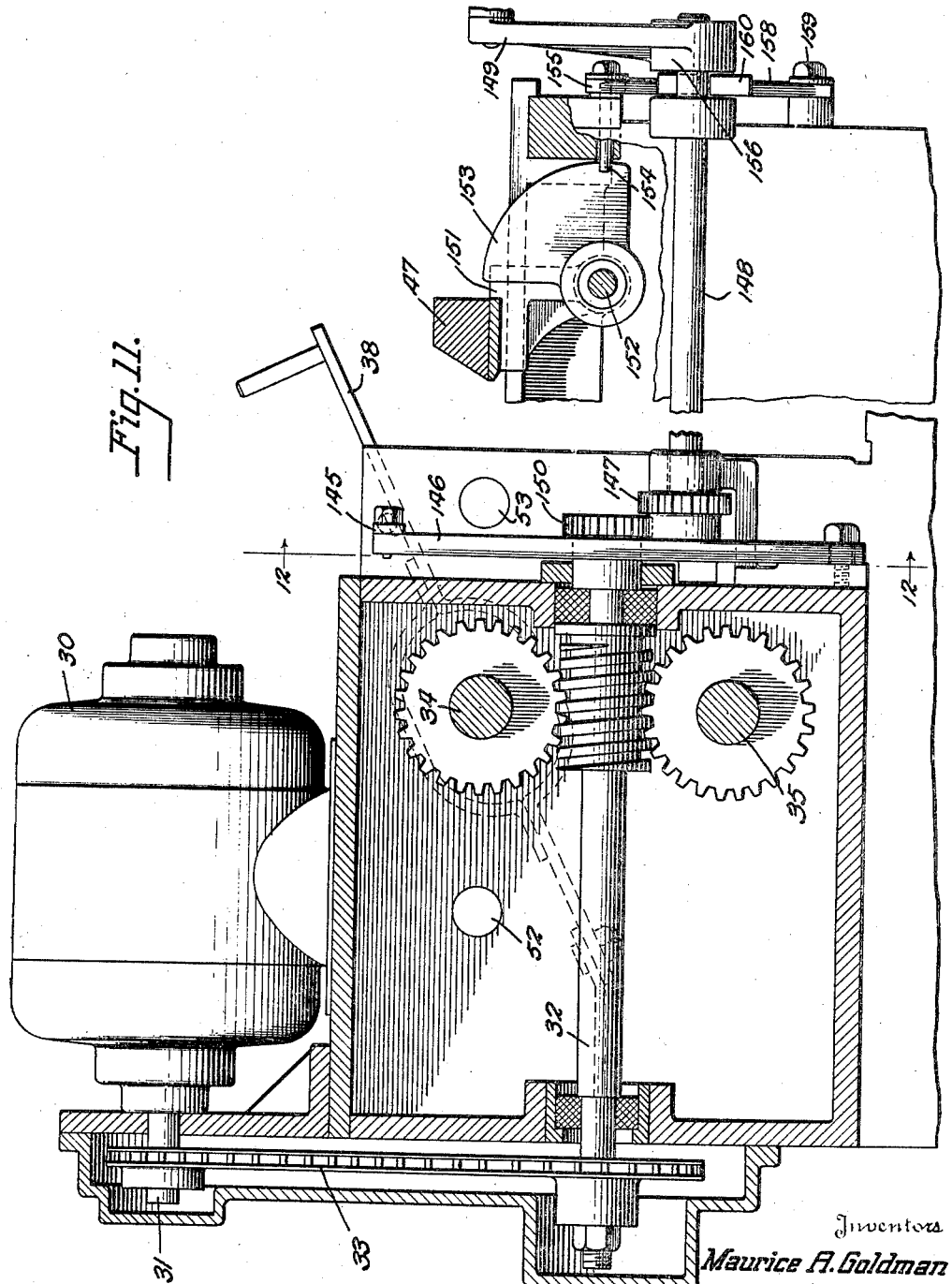

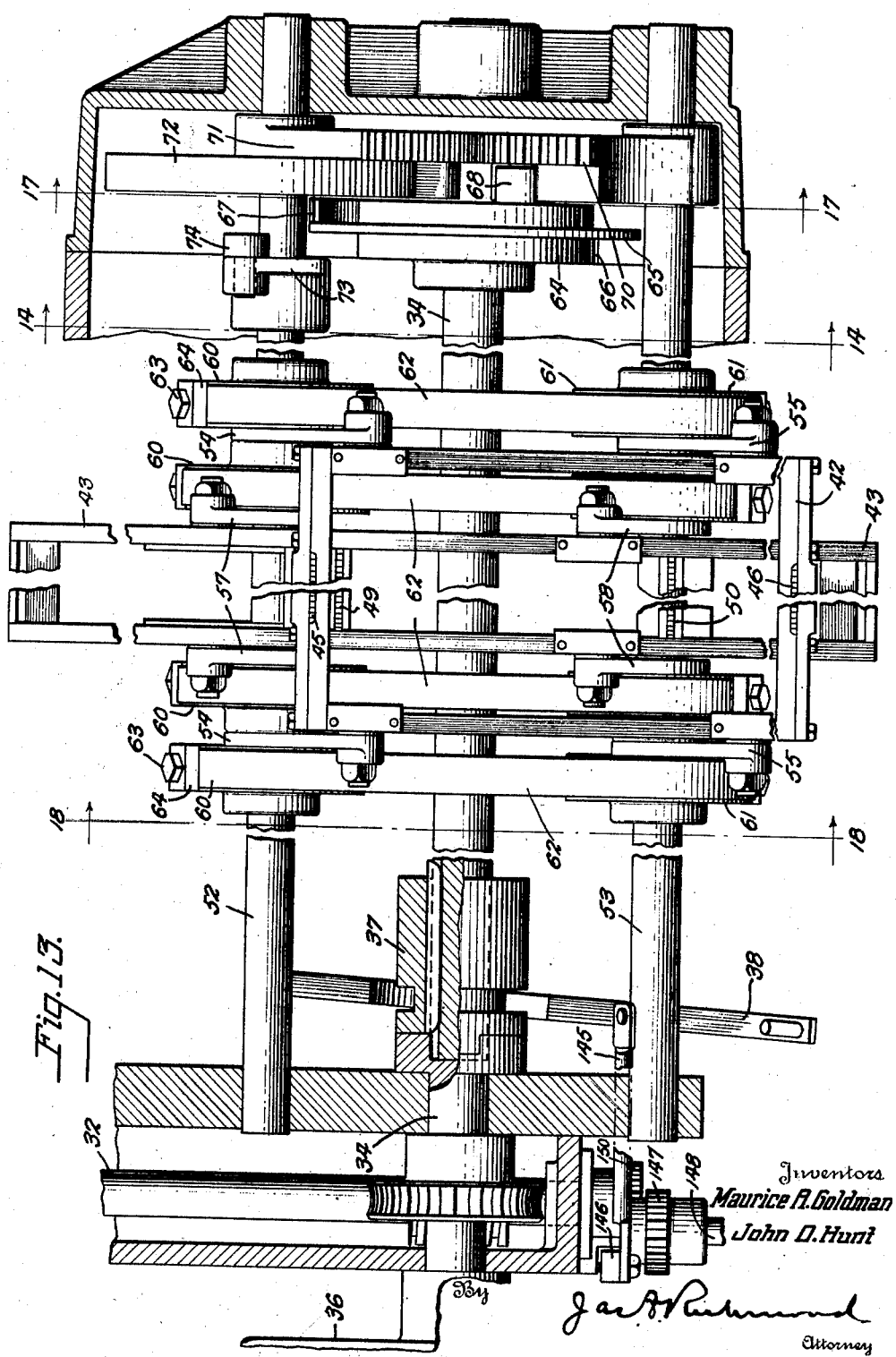

March 18, 1941.  M. A. GOLDMAN ET AL  2,235,760
LOOM
Filed Sept. 26, 1938   12 Sheets-Sheet 10
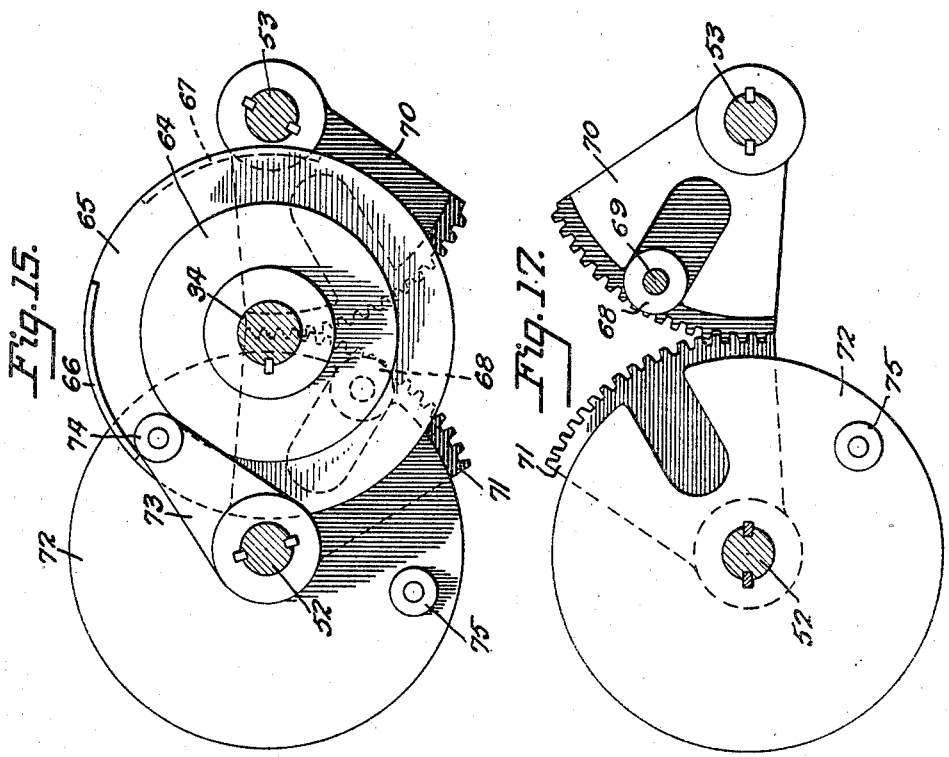
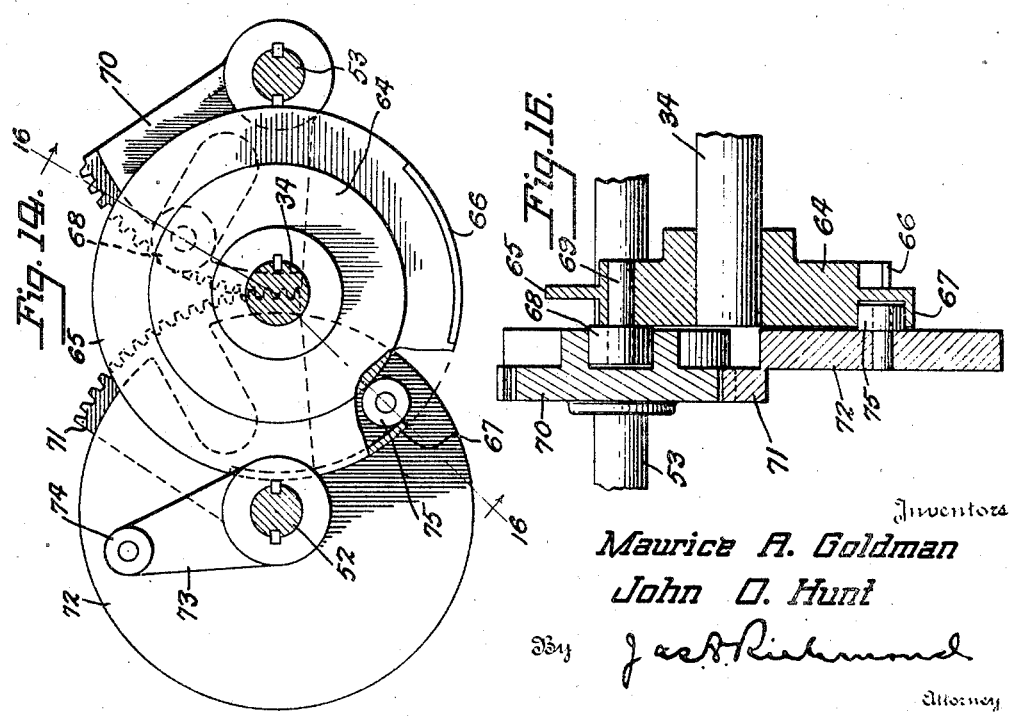
Inventors
*Maurice A. Goldman*
*John O. Hunt*
By *Jack Richmond*
Attorney March 18, 1941.    M. A. GOLDMAN ET AL    2,235,760
LOOM
Filed Sept. 26, 1938    12 Sheets-Sheet 11
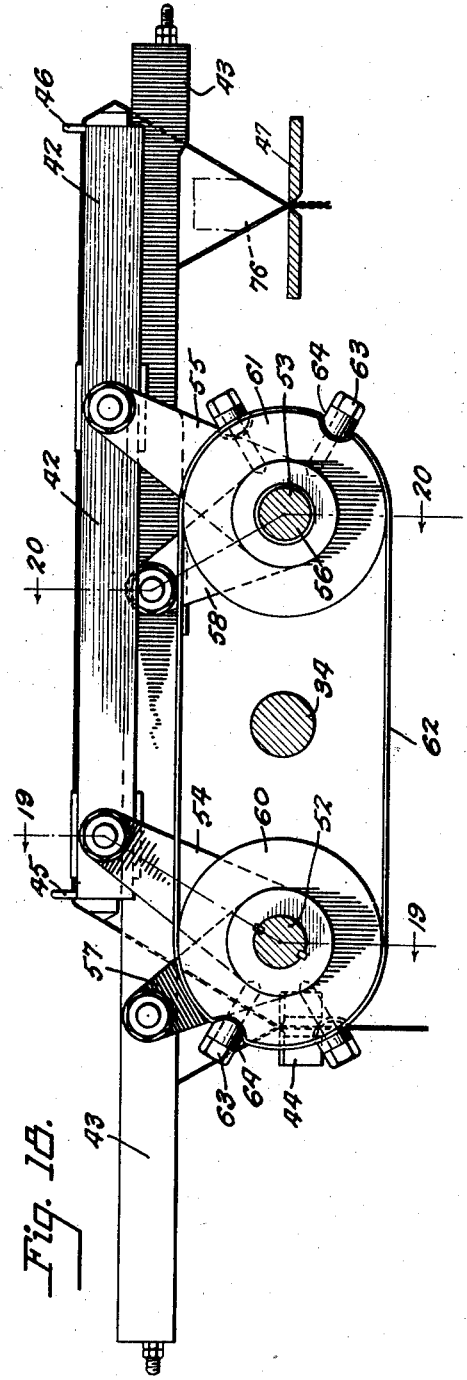
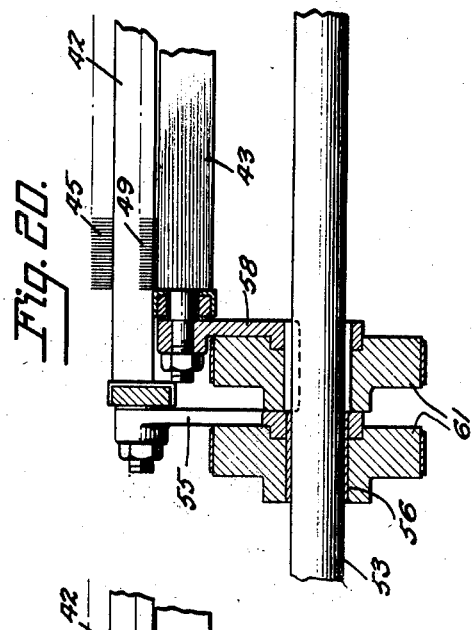
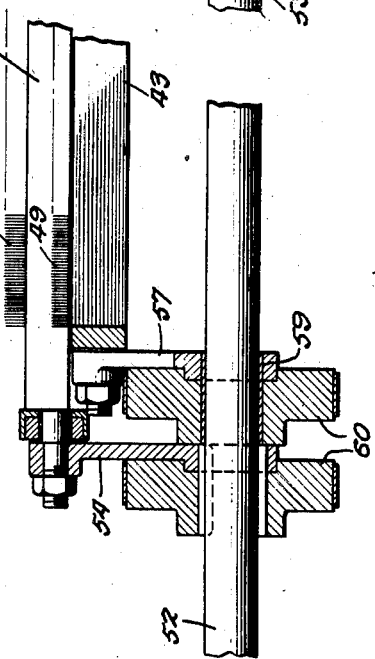
Inventors
Maurice A. Goldman
John O. Hunt
By Jas. A. Richmond
Attorney

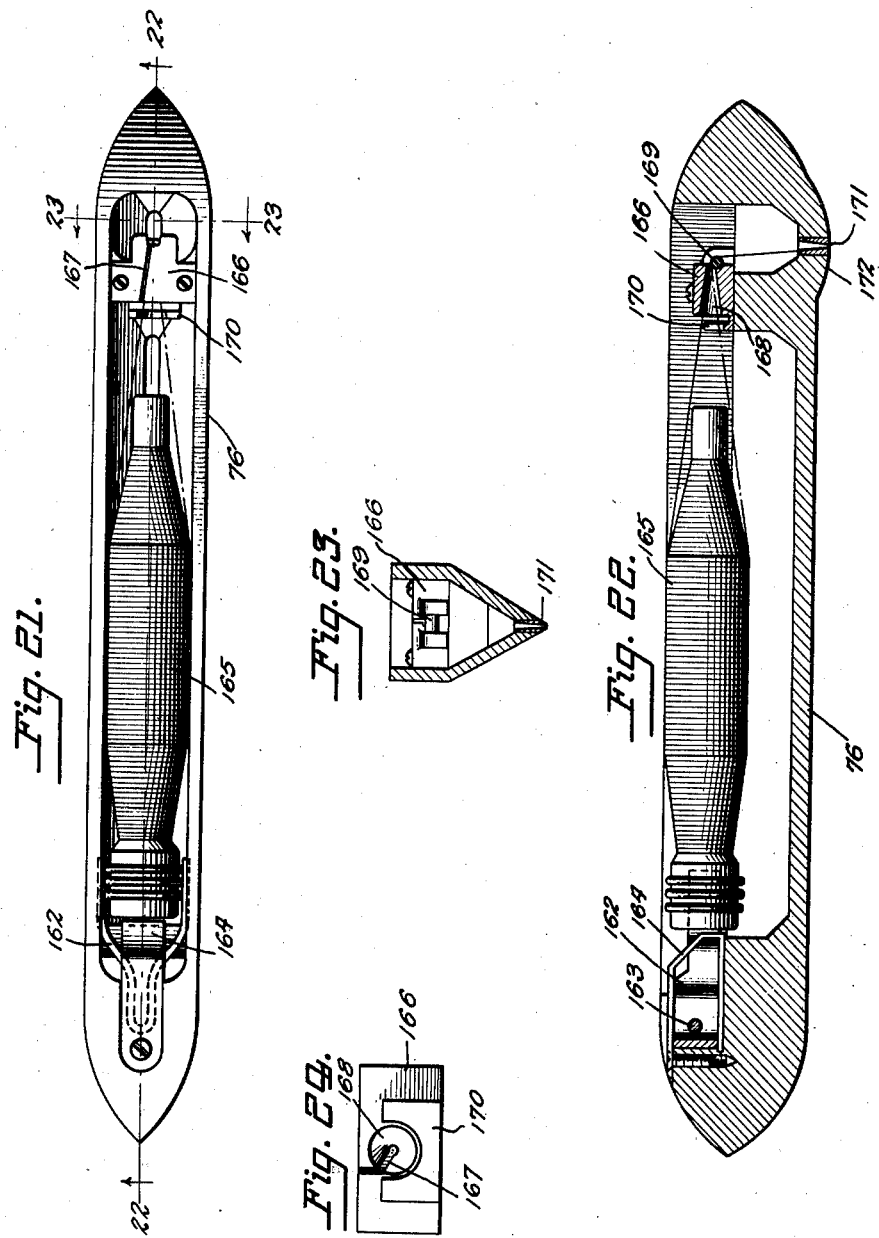

Patented Mar. 18, 1941

2,235,760

UNITED STATES PATENT OFFICE 2,235,760

LOOM

Maurice A. Goldman and John O. Hunt, Highland Park, N. J., assignors to Chicopee Manufacturing Corporation, Chicopee, Mass., a corporation of Massachusetts Application September 26, 1938, Serial No. 231,797

18 Claims. (Cl. 139—18)

The invention relates broadly to looms and the art of weaving and, more particularly, to vertical looms and is of special utility in the weaving of fabrics of the nature of gauze although this is stated by way of illustration and not by way of limitation. It was devised to obviate certain disadvantages attendant on the operation of the ordinary loom.

In looms as heretofore constructed the warp is either pulled from the warp beam by the intermittent motion of the heddles, the sudden jerk of which frequently breaks some of the warp threads, or the warp is unreeled from the beam by a mechanical let-off motion which operates when a feeder bar or other device is actuated by the taut warp and which idles when the warp is loose thereby causing a periodic unreeling of the warp and corresponding variations of the tension in the same. A diamond shaped shed is formed by a straight line motion of the heddles in opposite direction from end to end of the minor axis of the diamond. As the heddle eyes carrying the two banks of warp threads pass each other midway of the minor axis, the diamond is collapsed and as the length of the major axis is much less than two sides of the shed when open, the warp thread is very loose, only to be snapped taut at the end of the motion as the shed is re-opened. To reduce the above amount of looseness in the warp, on the front or weaving side of the heddles, there have been devised various compensating devices to keep all of the slack on the opposite or backside of the heddles. This causes the thread to slide backwards through the heddle eye as the shed closes and forward as it opens. As the distance it slides is many times the amount taken up in weaving by each motion, it is plain to see that each section of the thread undergoes this reverse scuffing action to such an extent as seriously to attack the structure of the thread and limit the speed of the machine.

The usual shuttle is propelled by a picker stick which is actuated by a strap from a rocker shaft which in turn is actuated by a cam, this indirect application of power making it necessary for the cam to have a very abrupt step so as to deliver practically a hammer blow to the shuttle. This is both a destructive and a limiting factor. The shuttle box or trap which catches and stops the shuttle is provided with various means such as side friction and trap levers but in all models the flying shuttle is stopped by a stationary box or trap causing great shock and a tendency to rebound. The shuttle deposits the weft thread at a considerable distance from the apex of the shed or weaving point making it necessary to employ a lay, reed or comb motion to carry the thread into position which operation limits the speed of the machine. The woven fabric is held in contact with the take-up roll by a complicated combination of spur gears, racks and torsion springs which makes equal pressure on the full length of the roll impossible, thus causing the rolls to bend or buckle.

As the heddles operate at right angles to the warp, they obstruct the operator's vision of the warp behind the heddles. The general scheme or layout is such that it is necessary to transmit power through long chains of gears with their back lash and irregular motion, through abrupt surface cams and straps, thereby limiting the productive capacity of the loom.

It is an object of the invention to provide a high speed loom which shall be very quiet in operation, with a great reduction in the time ordinarily required for making repairs in the machine and for repairing broken threads or picking out the fabric on account of broken threads or errors in weaving.

A further object of the invention is the provision of improved shed forming mechanism whereby an even tension shall be maintained at all times upon all parts of the warp, the length of the warp threads not being varied in operation due to the operation of the shed forming mechanism.

Another object of the invention is to provide a loom in which the operator can more readily observe all parts thereof due to the provision of horizontal heddles which do not obstruct the vision, as to the rear portions of the loom, as is the case in ordinary practice.

A further object of the invention is to provide improved shuttle operating mechanism whereby the shuttle may be operated without the usual noise and shocks and yet at very high speed.

Another object of the invention is to provide improved gearing connecting rotary parts of the loom, thus further reducing noise and vibration and affording a quiet and smoothly operating loom.

Another object of the invention is to provide an improved shuttle for vertical looms, whereby the weft thread is laid at the apex of the warp shed i. e., at the fell of the fabric.

Another object of the invention is to provide improved take-up and let-off mechanism whereby an even tension is maintained in the warp threads.

Other objects as well as the nature, characteristic features and scope of the invention more readily will be understood from the following detailed description taken in connection with the accompanying drawings, forming a part hereof, wherein—

Fig. 2 is a plan of the same.

Fig. 3 is a left end elevation.

Fig. 4 is a view principally in transverse section with parts omitted for clarity.

Fig. 5 is a horizontal section illustrating the shuttle operating mechanism.

Fig. 6 is a longitudinal vertical section illustrating the same mechanism on line 6—6 of Fig. 5.

Fig. 7 is a transverse vertical section on line 7—7 of Fig. 6.

Fig. 8 is a detail of the shuttle carriage and cooperating parts.

Fig. 9 is a cross-section of the shuttle carriage and guides on line 9—9 of Fig. 6.

Fig. 10 is a vertical section on line 10—10 of Fig. 7.

Fig. 11 is a section transversely of the loom showing parts of the drive gearing.

Fig. 12 is a section on line 12—12 of Fig. 11.

Fig. 13 is a plan partly in section and with parts omitted.

Fig. 14 is a section on line 14—14 of Fig. 13.

Fig. 15 is a similar view showing the parts in different position.

Fig. 16 is a section on line 16—16 of Fig. 14.

Fig. 17 is a vertical section on line 17—17 of Fig. 13.

Fig. 18 is a vertical section on line 18—18 of Fig. 13.

Fig. 19 is a section on line 19—19 of Fig. 18.

Fig. 20 is a section on line 20—20 of Fig. 18.

Fig. 21 is a top plan of the shuttle.

Fig. 22 is a longitudinal section on line 22—22 of Fig. 21.

Fig. 23 is a cross-section of the shuttle on line 23—23 of Fig. 21; and

Fig. 24 is a rear elevation of the thread-guiding block at the end of the bobbin.

Figure 1:
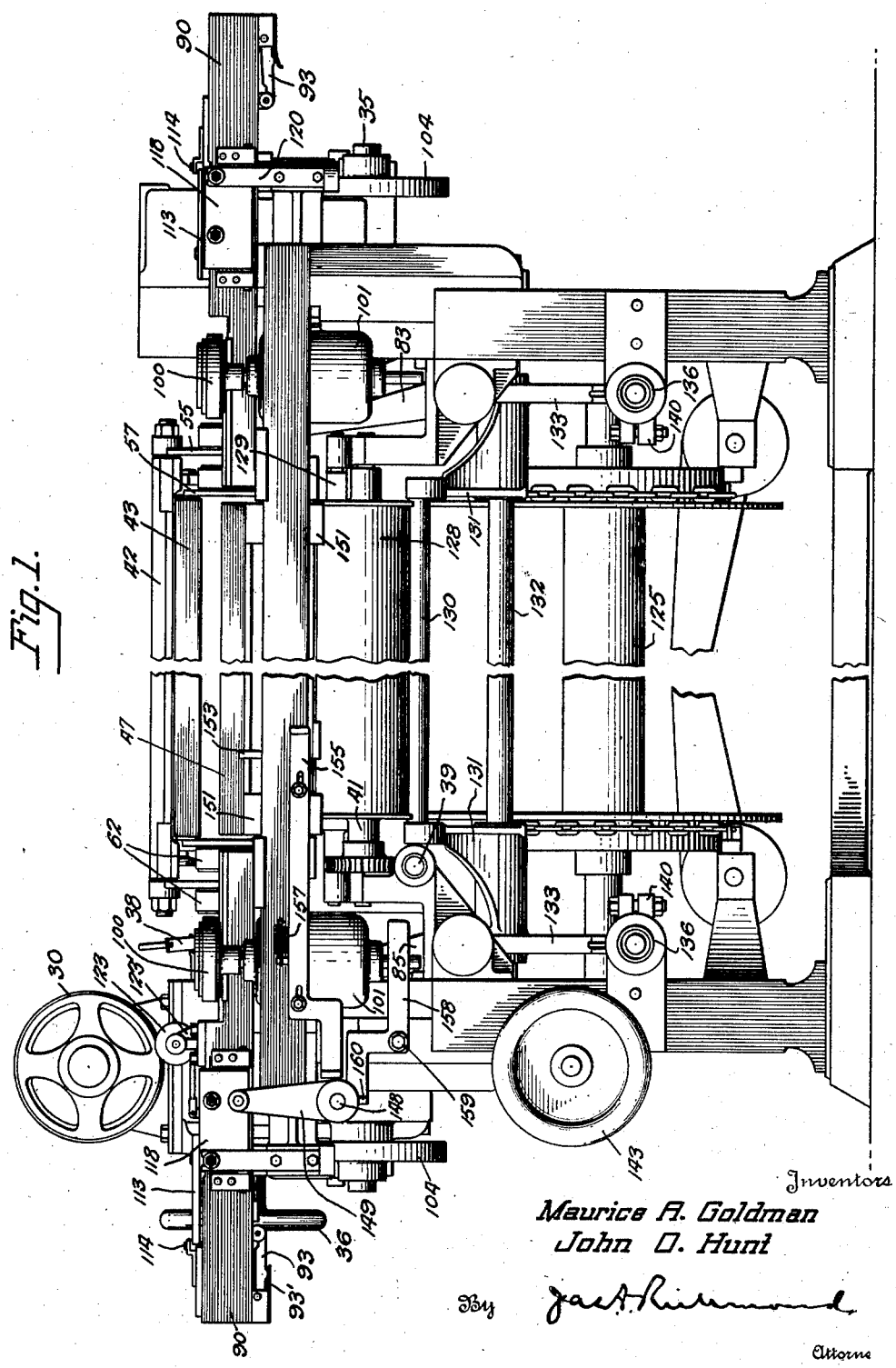
Figure 1 is a front elevation of the loom.

In the drawings reference character 30 indicates a motor for driving the principal parts of the loom, the motor shaft 31 being geared to the main shaft 32 of the machine by sprocket gearing indicated at 33. The main shaft drives shafts 34 and 35 through worm gearing shown in Fig. 11, shaft 34 being provided with a hand wheel 36 for manual operation. A clutch shown at 37 in Figs. 2 and 13 is operated by a clutch lever 38 to connect or disconnect the shaft 34 and the gearing for driving the same. The shaft 35 is connected by worm gearing shown in Fig. 4 to a shaft 39 which in turn is connected by worm gearing to shafts 40 and 41 for driving the same.

*Shedding motion*

The shedding motion (best shown in Figs. 4 and 18) comprises an upper harness 42 and a lower harness 43. The warps of one set pass upward through a guide 44, then through slots in a pair of combs 45 and 46 at opposite ends of the upper harness and then downward to a slot in the bottom of a shuttle race 47. It will be noted that the end bars of harness 42 are shaped to maintain a uniform tension on the warps, as will be further described hereinafter. The warps of the other set pass upward from the guide 44 through slots in heddles 48, then through combs 49 and 50 on the harness and then through slots in another set of heddles 51 and downward to the guide in the shuttle race 47.

The upper harness is supported upon a pair of shafts 52 and 53 by means of rock arms 54 and 55, rock arm 54 being splined to the shaft 52 as shown in Fig. 19 and rock arm 55 being journaled on a bushing 56 on shaft 53. In similar manner heddle 43 is supported by a pair of rock arms 57 and 58, respectively, on shafts 52 and 53, arm 58 being splined to shaft 53 and arm 57 being journaled on a bushing 59 on shaft 52. The shafts 52 and 53 have disks 60 and 61, respectively, mounted thereon at opposite sides of the shedding motion and there is a band 62 at each side of the shedding motion secured to and rigidly connecting the disks 60 and 61, as by means of screws 63 bearing on collars 64 with rounded portions forcing parts of the corresponding band into depressions in said disks. The disk which is adjacent to a splined rock arm 54 or 58 is splined to the corresponding rock shaft so that the rock arm must rock with its disk, while disks adjacent to loose arms 55 and 57 are journaled on the same bushing as the rock arm and secured to the adjacent rock arm to cause the arm to oscillate with the disk.

The harnesses are operated to impart a harmonic intermittent reciprocation to the heddles or equivalent devices by means now to be described, the arrangement being such that the length of the warp threads is not varied due to the motion of the harnesses, thus maintaining an even tension in all the warps without changes due to the movement of the heddles and thus also doing away with any necessity for special means for taking up slack in the warps. The shaft 34, as shown in Figs. 13 to 17, is provided with a driver in the form of a disk 64 having a radially extending fin 65 midway between its ends and extending about the periphery of the disk. This fin has oppositely extending flanges 66 and 67 at its outer periphery extending axially of the shaft and in opposite directions from the fin so as to provide arcuate slots between said flanges and the body of the disk at opposite sides of the fin 65. If now the shaft 34 and the disk 64 be rotated clockwise in Fig. 14 a roller 68 on a pin 69 carried by the disk will engage in a slot in a segment 70 splined to rock shaft 53 and will rock said shaft counterclockwise so as to swing arm 58 counterclockwise or toward the position shown in Fig. 18. In such movement the band 62 connecting disk 61 to disk 60 will cause the latter to turn counterclockwise and the arm 57 is also forced to move due to its connection with the harness frame 43. It will be noticed that the movement of any given part of the harness frame 43, such as the heddle eyes, will be an arcuate one corresponding to the movement of the point of connection between a rock arm and the harness. Since all of the guiding elements for a given warp lie in the same vertical plane, it follows that there will be no change of tension on any part of the warps and therefore no need for any compensation, and no sliding of the warp through heddle eyes or analogous elements due to movement of the harness.

At the same time that segment 70 is being moved counterclockwise a segment 71 splined to rock shaft 52 is being moved clockwise due to the interengagement of the rack teeth on segments 70 and 71 at this time, for which reason the harness frame 42 is now being moved clockwise or toward the position shown in Fig. 18, due to the fact that rock arms 54 are splined to the rock shaft 52, and the thread engaging points on this harness frame also have an arcuate movement, as explained above and with the same result for the warps controlled thereby.

Adjacent to segment 71 there are splined to shaft 52 a disk 72 and a crank 73 carrying a roller 74. The disk 72 also carries a roller 75. Now as the parts approach the position of Fig. 15 roller 68 will pass out of the slot in segment 70 and into the slot in segment 71, the heddle frames remaining stationary during such passage and the shuttle being picked at this time to insert a weft in the shed. Immediately thereafter the roller 68 will engage in the slot in rack segment 71 and thereupon the direction of movement of shafts 52 and 53 is reversed and the harness frames are moved to a position which is the opposite of that shown in Fig. 18, segment 70 being now moved clockwise as segment 71 moves counterclockwise and the parts returning to the position of Fig. 17, where the roller 68 again is transferred from the slot in segment 71 to that in segment 70 for again reversing the movements of the harness frames. The flanges 66 and 67 serve respectively to engage with the rollers 74 and 75 for preventing excess movement of the rack segments, with consequent possible disengagement thereof or with damage to parts driven thereby. It will be noted that flange 66 is in engagement with roller 74 in Fig. 15 as the roller 68 is transferred leftward from segment 70 to segment 71, while Fig. 14 shows the roller 75 as being engaged by flange 67 as the roller 68 moves across from rack 71 to rack 70. It will be seen from the foregoing that the harness means is always under positive control by the Geneva mechanism of Figs. 14 to 17.

The warps lie against the inclined walls of the shuttle race 47, as shown in Fig. 4, when the shuttle is being reciprocated. The end bars of the upper harness are oppositely beveled to assist in maintaining even tension on the warps in the opposite positions of this harness and to avoid sharp bending of the warps.

*Picking mechanism*

For picking the shuttle 76, shown in dotted lines in Figs. 4 and 6, there is provided a cam groove in a cylindrical cam 77 on the shaft 35, this groove engaging a roller 78 on a rock arm 79 connected by link 80 to a rock arm 81. Rock arm 79 is fixed to a rock shaft 82 carrying a picker stick 83 and rock arm 81 is fixed to a shaft 84 carrying a picker stick 85. As the picking mechanisms at opposite ends of the shuttle race 47 are duplicates only one will be described.

The picker stick 85 (Fig. 8) is pivotally connected to a bar 86 which is connected by a spring 87 to a carriage 88 having rollers 89 supported on tracks in a cage 90. The bar 86 is also provided with supporting rollers 91 movable on tracks in said cage. At its outer end the carriage is provided with a resilient buffer 92 to assist in cushioning the shock of the entering shuttle 76 and preventing noise. A pair of spring pressed latches 93 pivoted at 94 each have an upwardly extending detent portion 95 for engaging with the depending nose 96 on the carriage to hold it in its extreme outward position, the springs being shown at 93'. In this position, as will be seen in Fig. 6, the springs 87 are extended. The bars 86 also each have a depending projection 97 engaging in a slot in the bottom of cage 90 for guiding the bar, and a resilient buffer 98' is provided to limit the inward movement of the carriage and cushion its shock against the end of the shuttle race. Near their outer ends the bars 86 have projections 98 having cam faces at their right hand end, as seen in Fig. 8, for releasing the detents 95 from the carriage. It will be seen therefore, that upon commencement of the stroke of picker stick 85 to the right the bars 86 will act to increase the tension on springs 87 and to release the latches 93 and thereby catapult the shuttle crosswise of the loom, but without the usual hammer action. This is the first stage in the propulsion of the shuttle.

The second stage of propulsion is caused by a pair of friction wheels 100 (Figs. 1, 2, 5, 6 and 7) located at opposite sides of the shuttle race. These wheels are mounted on shafts driven by motors in casings 101, each of said casings being supported by a bracket 102 pivoted at 103 (Fig. 5). The friction wheels accelerate the speed of the shuttle up to a predetermined speed and are held in position to contact with the sides of the shuttle for that purpose. After the shuttle has reached the predetermined speed desired (or after it has passed the wheels) the driving wheels 100 are swung away from the shuttle by means of the pivoted brackets, which are moved in opposite directions by means shown in Figs. 5 and 7 comprising face cams 104 on shaft 35 each having a cam slot engaged by a roller 105 carried by a reciprocating bar 106 guided at its outer end in a bracket 107 on the machine frame, said bracket being provided with a track for an anti-friction roller 108 (Fig. 10). The bars 106 are each connected by means of a turnbuckle 109 to a yoke 110 (Fig. 5) pivoted at 111 on a bracket 102. The pair of brackets 102 at one end of the loom are pivotally connected together at 112 to insure equal and conjoint movement of the brackets and the parts actuated thereby.

Adjacent the outer end position of the carriage there are two oppositely acting carriage brake levers 113 pivoted at 114 and provided with springs 115 tending to force they away from the carriage. These brake levers are provided with faces 116 of braking material and carry rollers 117 at their outer faces. Wing-like levers 118 are pivoted at 118' for movement transversely of the carriage track and are pressed inwardly by adjustable springs 119 to force the brake levers inward for gripping the carriage to aid in decelerating the carriage on its outward movement and to aid in holding it in its outward position until released by the action of bars 86. At such time the levers 118 are retracted so as to free the brake levers for retraction by springs 115 and this is done by means of vertical fingers 120, one being mounted on a yoke 110 and the other on a bracket 102, said fingers engaging with threaded studs 121 secured to levers 118 and provided with adjusting nuts for varying the innermost or operative position of the levers 118. It should be noted that the inner positions of the motor driven friction wheels 100 are determinable by means of turnbuckles 109. Guide pins 122 on yokes 110 engage loosely in holes in bars 106. A roller 123 (Fig. 1) is mounted on brackets 123' on the cage 90 above the inner end of the shuttle to prevent that end of the shuttle from tilting upward at the end of its stroke.

Before the shuttle returns the cylindrical cam 77 will have returned the picker so as completely to relieve the tension in the carriage springs 87 and to move the carriage back about one-half of its total stroke. It will be seen that the checking of the shuttle takes place in two stages, as well as the propulsion of the shuttle, since it first strikes the shuttle carriage in its inner position where the stop 97 rests against buffer 98', then is gradually decelerated as the carriage moves outward for the remaining one-half of its total travel under the impulse of the shuttle, expanding the spring 87 (the carriage being also retarded by its brakes 116), and then being finally arrested as the carriage stops against the end of the cage 90, where the carriage is now held by the detent 93. It will be understood that the wings 118 are so related to their operating mechanism that they can force the shuttle brakes inward sufficiently to bear against the shuttle but that the friction wheels 100 reach their innermost position after the shuttle has passed in its return stroke too far to be engaged by them.

*The let-off and take-up mechanism*

As explained above, shaft 39 drives shafts 40 and 41 through worm gearing. The shaft 40 carries a let-off roll 124 which is covered with cork or otherwise is given the desired frictional engagement with the warps which are drawn by this roll from a warp beam 125 and over a pair of idlers 126 and 127, passing then to the guide 44 which may be provided with suitable means for guiding the separate warps and holding them in place.

A take-up roll 128 for the cloth is mounted on shaft 41, this roll being preferably covered with sandpaper or other suitable means for providing the requisite friction. From the take-up roll the cloth passes over an idler 129 and then to the cloth roll 130 which is frictionally driven by peripheral engagement with the take-up roll 128. The cloth roll is carried by a pair of arms 131 mounted on a shaft 132 provided with a segment 133 about which there is passed a length of wire or the like 134, secured at one end to the upper part of the segment and having at the other end a head 135 in a tube 136. A coil spring 137 surrounds the member 134 between head 135 and a cap 138 forming the end of the tube and through which the member 134 passes. The tension of the springs, whereby the cloth roll is pressed against the take-up roll 128 may be adjusted by means of a nut 139 on the tube 136, this nut pressing against a bearing 140 in which the tube is slidably mounted. In order to provide for relative disengagement when the fabric roll is to be removed from the take-up roll for doffing, the shaft 132 is equipped with a toothed segment 141 (Fig. 3) adapted and arranged for cooperation with a worm 141' which is mounted with a limited amount of end play on a shaft 142 which may be operated by a hand wheel 143. A sleeve 142' is equipped with collars 142'' and 142'''. The latter is under the pressure of a spring 143' thereby tending to slide the worm towards the left. The collar 142'' has a cam face 143'' which cooperates with a pivotal latch 143''' to restrain rotation of shaft 142 in one direction. A comb 144, shown in this figure, may be provided between the beam 125 and the idler 126 to aid in maintaining the individual warps in position.

*Safety devices*

In Figs. 2 and 13 there is shown a clutch member 37 slidably mounted on shaft 34, with a shifter 38 for putting it into and out of action so as to inactivate the shed forming mechanism. At this time, of course, the said mechanism may be operated by hand by means of wheel 36. A link 145 (Figs. 2, 12 and 13) is connected at one end to the lever 38 and at the other end to a lever 146 having a cut-out portion partially encircling a shaft 148 carrying a crank 149 by means of which shafts 34 and 35 may be manually operated when pinion 147 is in mesh with a pinion 150 on shaft 32. When the clutch 37 is engaged, lever 146 occupies the dotted line position in Fig. 12, wherein it prevents the shaft 148 from being moved to the left in Fig. 11 to engage pinion 147 with pinion 150, thus avoiding any possibility of actuation of handle 149 while clutch 37 is engaged.

It is sometimes desirable to secure ready access to the raceway for the shuttle and related parts, which is difficult due to the fact that this raceway is but little removed from the horizontal harness frames, as best shown in Fig. 4. For this reason the front member of the raceway is provided with pivotal supporting means (Figs. 4 and 11) comprising brackets 151 pivoted at 152 so that said member can be turned clockwise to a sufficient distance for the purpose. For holding this race member normally in operative position there is provided a segment 153 rigid with the bracket 151, said segment having a hole for engagement by a pin 154 carried by a slide 155 mounted on the breast beam of the loom and having an end portion so positioned as to be in the path of enlarged portion 156 of handle 149 thus preventing manual operation of the loom while said race member is out of operative position. The slide 155 is normally held in the position shown in Fig. 1 by means of a spring 157.

Below the slide 155 a bent lever 158 is pivoted on the frame at 159 said lever having an enlarged end portion 160 also in the path of the collar 156, said lever preventing the handle from being pushed in to connect pinions 147 and 150 except after lever 158 is moved on its pivot to remove its end 160 from the path of handle portion 156.

The shuttle 76 (Figs. 4, 6 and 21 to 24) is provided at one end with a bobbin holder 162 secured by a bolt 163 and a bobbin guide 164 for a bobbin 165. At its front end a block 166 is mounted, said block being provided with a threading slot 167 leading to a tapered hole at 168 for guiding the thread to a supporting bar 169. At the rear of hole 168 there is additionally a flange 170 with a semi-circular opening leading to the hole 168. From the bar 169 the thread leads to an eye 171 at the bottom of a swell 172 which is a continuation of the apex of the V-shaped bottom portion of the shuttle and which lays the weft at the bottom of the vertical V-shaped shed, or at the fell of the cloth, thus doing away with any need for beat-up mechanism or its equivalent.

Having described the invention, what is claimed, is:

1. A vertical loom having horizontal harnesses, means coacting therewith to form a V-shaped shed, said means including a V-shaped shuttle race underneath said harnesses having a front member, a shuttle in said race with a V-shaped lower portion, and pivotal means for supporting the front member of said V-shaped race to facilitate access to the shuttle.

2. A device as in claim 1, and means to prevent movement of said front member when the loom is being operated manually.

3. A loom having horizontal harnesses, means coacting therewith to provide a V-shape shed below the harnesses, and including a V-shape shuttle race, a shuttle, picking means for moving the shuttle through said shed, a pair of shafts parallel to the path of said shuttle, means connecting one of said shafts to the harnesses, a cylindrical cam on the other of said shafts with a groove in its periphery, and a follower in said groove connected to the picking means for driving the same.

4. A vertical loom including a pair of horizontal harnesses, a pair of shafts beneath them, means coacting with said harnesses to provide a vertical shed at each end of the harnesses, rock arms supporting each harness on said shafts, and means for rocking said shafts equally in opposite directions.

5. A device as in claim 4, each of said shafts having a pair of rock arms fixed thereto and to one of said harnesses to operate the harness, and each shaft having another pair of rock arms journaled thereon and supporting in horizontal position the harness operated by the other of said shafts.

6. A vertical loom comprising a pair of horizontal harnesses, means coacting therewith to form a vertical shed, means for imparting a harmonic movement to said harnesses including a pair of rock shafts each connected to drive one of said harness, intermeshing racks on said rock shafts, a constantly rotating drive shaft, a pin on the shaft, and a slot in each rack for alternate engagement by said pin.

7. A vertical loom having horizontal harnesses with warp-guiding means spaced lengthwise thereof, fixed warp-guiding means vertically spaced from each of said first-mentioned warp-guiding means, and harness-operating means arranged to move the warp-guiding means thereon with reference to said fixed warp-guiding means in such manner as to maintain uniform tension on the warps.

8. A vertical loom having horizontal harnesses with warp-guiding means spaced lengthwise thereof, fixed warp-guiding means, and harness-operating means arranged to move the warp-guiding means thereon in arcuate paths with reference to said fixed warp-guiding means.

9. A vertical loom having horizontal harnesses, means coacting therewith to form a V-shape shed, said means including a V-shape shuttle race beneath said harnesses and having a front member, a shuttle, pivotal brackets supporting said member whereby it may be moved clockwise an effective distance for access to the shuttle, and means to prevent operation of the loom when said member has been moved clockwise.

10. A vertical loom having horizontal harnesses, a warp beam, and a cloth roll, combined with means whereby the warp threads in their travel from the warp beam to the cloth roll are caused to change direction when arriving at the harness mechanism so that their direction of travel will be substantially in the general direction of reciprocation of the harness mechanism and to change direction again when leaving the harness mechanism whereby to produce a V-shape shed, a shuttle race in the V shed and of conforming shape to support the shed, and a shuttle adapted to lay the weft closely adjacent the point of the forward V-shape shed.

11. A loom as set forth in claim 10 wherein the shuttle race is stationary and the shuttle is free while within the shed and in which the shuttle in successive passages through any point in the shed moves in opposite directions.

12. A vertical loom having horizontal harnesses, warp guiding means spaced lengthwise thereof, fixed warp guiding means vertically spaced from the harnesses and co-acting therewith to provide a pair of V sheds whereof one is a true shed and the other a false shed, harness operating means adapted to move the first-mentioned warp guiding means with reference to the second so as to maintain uniform tension on the warp, and a shuttle operatively mounted in the true shed for laying the weft in the apex thereof.

13. A vertical loom having horizontal harnesses, a warp beam, and a cloth roll, combined with warp guiding means whereby the warp threads in their travel from the warp beam to the cloth roll are caused to follow the general direction of reciprocation of the harnesses and to change direction when leaving the harnesses so as to provide a V shed, and harness operating means, the warp guiding means being responsive to movement of the harness operating means to maintain uniform tension on the warp threads.

14. A vertical loom according to claim 13, including a shuttle adapted and arranged to be reciprocated through the shed, and means for causing the shuttle to lay the thread at the fell of the cloth whereby beat-up mechanism may be dispensed with.

15. A vertical loom according to claim 12, including, as an element of the shed forming means, a shuttle race to support the shed when the shuttle is reciprocated.

16. A vertical loom according to claim 12, wherein the harness operating means includes Geneva gearing whereby the harness mechanism is always under positive control.

17. A vertical loom having upper and lower horizontal harnesses, vertically disposed warp guiding devices, including a shuttle race, co-acting with the harnesses to form a V shed, the shuttle race having inclined side walls to form the apex of the shed, a shuttle, and means effective to insure freedom of the shuttle while within the shed whereby in successive passages through any point in the shed it moves in opposite directions.

18. A vertical loom having horizontal harnesses, warp guiding means, including a V shuttle race, to form a V shed, and a shuttle operating within the shed, the warp threads lying against the inclined walls of the shuttle race when the shuttle is reciprocated.

MAURICE A. GOLDMAN.
JOHN O. HUNT.